Aug. 25, 1931.  R. A. WALTER  1,820,852
DRIVING MECHANISM
Filed Aug. 23, 1928  2 Sheets-Sheet 1
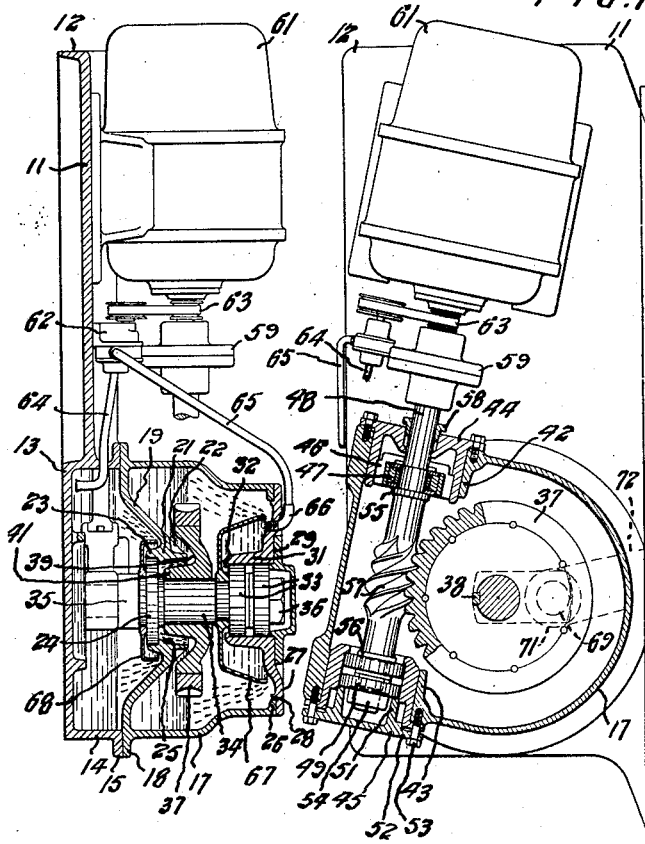
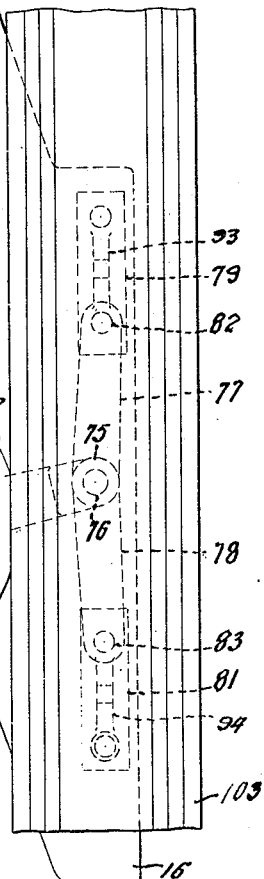
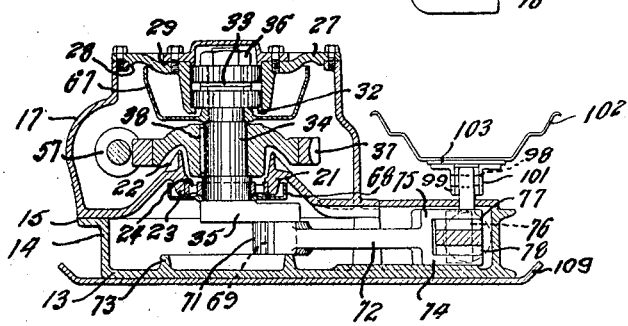
INVENTOR
RAYMOND A. WALTER
BY
ATTORNEYS

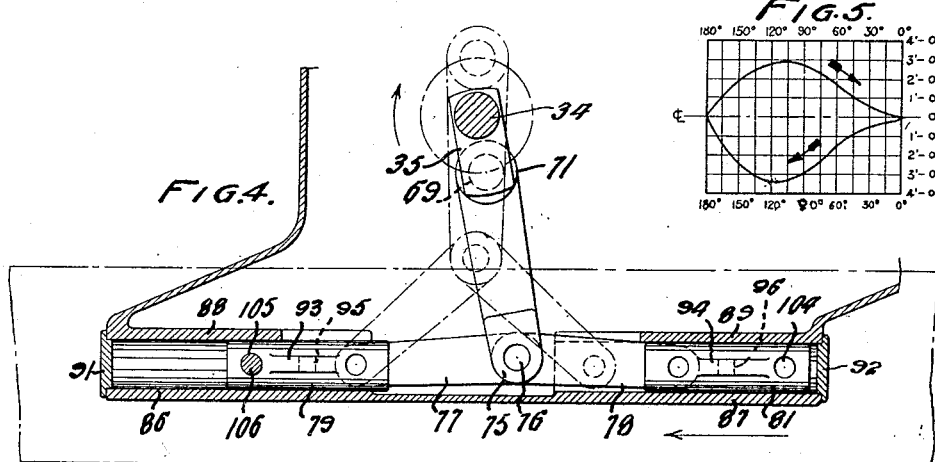
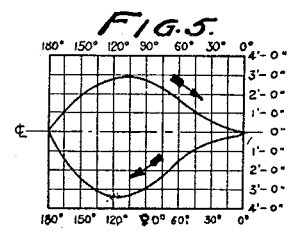
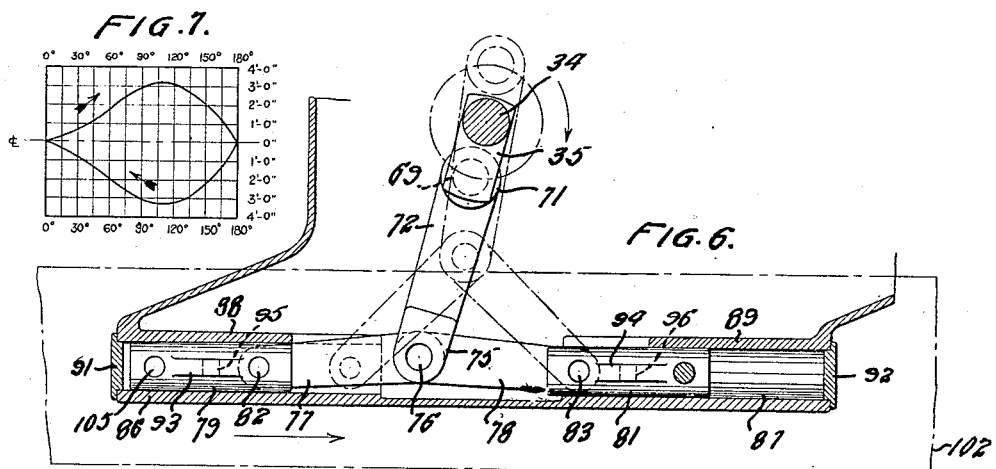
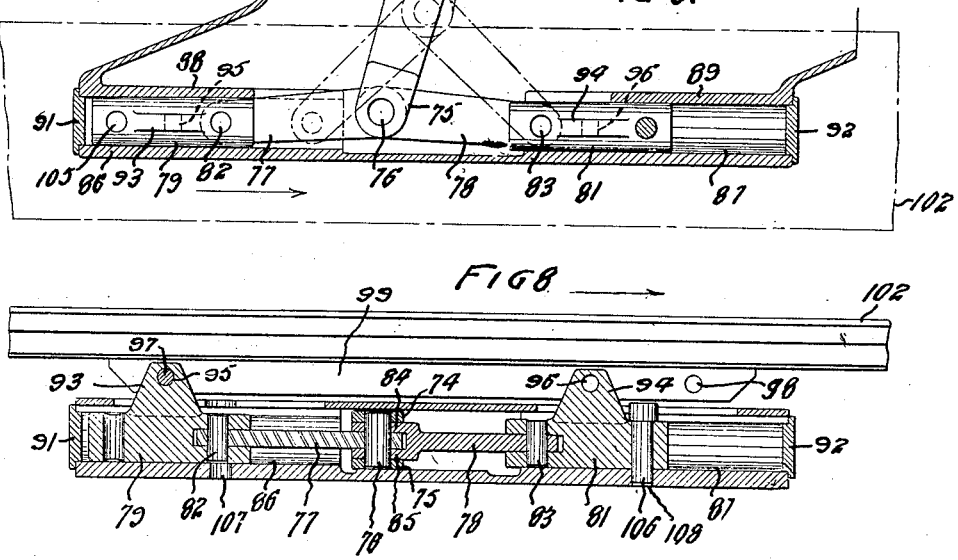

Patented Aug. 25, 1931

1,820,852

UNITED STATES PATENT OFFICE

RAYMOND A. WALTER, OF NEW YORK, N. Y.

DRIVING MECHANISM

Application filed August 23, 1928. Serial No. 301,555.

This invention relates in general to reciprocating drives and more particularly has reference to a driving mechanism for reciprocating conveyors.

Previous to this time in drives of this character, no provision has been made for the thorough lubrication of the various elements constituting the mechanism. The lack of lubrication of certain of the parts has often caused damage and interrupted the efficient operation of the drive, sometimes requiring repairing the mechanism. In instances where the parts have been flooded with lubricant, the friction of the drive has so heated the surrounding lubricant as to make it necessary to discontinue operation of the drive at frequent intervals to allow the lubricant to cool.

The motion translating devices used in connection with these types of drives have not generally been capable of adjustment for reversing the stroke of the conveyor, and hence the position of the drive has had to be changed when it was desired to transport material in the opposite direction to the normal course of travel. The casings for these devices have heretofore usually formed a portion of the housing encasing the driving gear and not allowed ready emplacement of the mechanism in workings affording only a small amount of headroom.

The driving mechanisms employed in the past have also been adapted to operate a conveyor through a driving lever connected to a crosshead, thus imparting the motion through an arc and creating pendulum stresses which have been objectionable to the efficient operation of the drive. These levers projecting through slits in the housings of the mechanisms have exposed the interior of the casings to the entrance of foreign material liable to damage the mechanism.

An object of this invention is to provide a driving mechanism for a reciprocating conveyor in which all of the operative elements may be maintained submerged in lubricant.

Another object of this invention is to provide a driving mechanism for a reciprocating conveyor in which the lubricant surrounding the operative elements may be circulated.

Still another object of this invention is to provide a driving mechanism for a reciprocating conveyor in which all of the operative elements may be maintained submerged in lubricant and a cooling effect obtained during operation of the drive.

A further object of this invention is to provide a driving mechanism for a reciprocating conveyor having a motion translating device capable of adjustment for reversing the direction of the drive.

A still further object of this invention is to provide a driving mechanism for a reciprocating conveyor in which the reciprocating motion is imparted to the conveyor in a fixed vertical and horizontal line.

A still further object of this invention is to provide a driving mechanism for a reciprocating conveyor in which the casings enclosing the motion imparting device may be emplaced under the conveyor trough to which it is attached.

A still further object of this invention is to provide a driving mechanism for a reciprocating conveyor in which the exposed portions of the interior casing through which connection with the conveyor trough is afforded are protected from the entrance of foreign material.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular construction, which for the purpose of explanation, have been made the subject of illustration.

In the drawings forming a part of this specification:

Figure 1 is a top plan view of the driving mechanism forming the subject matter of this invention.

Figure 2 is a side elevational view of the driving mechanism.

Figure 3 is an end elevational view of the driving mechanism.

Figure 4 is a top plan view showing the mechanism positioned for effecting the transport of material in the direction indicated by the arrow.

Figure 5 is a graph of the motion imparted by the driving mechanism when adjusted for transport in the direction shown in Figure 4.

Figure 6 is a top plan view of the driving mechanism adjusted to effect transport in the reverse direction from that shown in Figure 4, as indicated by the arrow.

Figure 7 is a graph of the motion imparted by the driving mechanism when adjusted for transport in the direction shown in Figure 6.

Figure 8 is a side elevational view of that part of the driving mechanism shown in Figures 4 and 6.

Referring by numerals to the drawings, in which the same and similar elements are designated by like symbols of reference throughout, and more particularly to Figure 1, there is shown the improved device comprising a base 11 for mounting the mechanism.

The base 11, as shown in Figure 2, is formed at one end with a downwardly projecting flange 12 adapted to act as a support for a prime mover and at the other end with an integral well 13. The well is formed with walls 14 projecting above the base and provided at the top with an outwardly extending flange 15. The opposite side of the base is formed with an extension 16, the same being an extension of the well 13, as shown in Figure 3. The extension 16 forming a part of the well is provided with guides for receiving crossheads to impart an accelerated and retarded reciprocating motion to a conveyor to be hereinafter described.

A casing 17 for mounting a driving mechanism is fitted on the base over the well. The casing 17 is formed with an outwardly projecting annular flange 18 around the bottom adapted to be seated on the flange 15 around the top of the well and fastened thereon in any suitable manner, such as by bolts engaging the flanges, having a gasket interposed between the flanges to insure a tight connection. The casing 17 is formed with a raised bottom 19, having a central aperture therein surrounded by a collar 21 extending above and below the bottom and reinforced on the top by fins 22.

The underside of the collar 21 is provided with an indented seat 23 adapted to receive a bearing 24, and the interior of the upper portion of the collar tapered downwardly toward the bearing as at 25, so that the top of the collar acts as a dam for lubricant placed in the bottom of the casing. The top of the casing is formed with an integrally projecting flange 26, for receiving a closure 27 having an annular bead 28 formed around the inner face thereof adapted to fit against the inside of the flange 26. The closure 28 is provided with an indented seat 29 having a central aperture therein and formed with a downwardly projecting collar 31 around the rim of the aperture, having an inwardly projecting flange 32 at the bottom. The collar 31 is intended to receive a bearing 33 adapted to be seated on the flange 32. A shaft 34 is mounted in the casing 17 with the ends journaled in the bearings 24 and 33.

A crank 35 is fixed on the bottom end of the shaft, outside the casing 17, below the bearing 24. The shaft is fixed in the top bearing 33, by a nut 36, the end of the shaft being provided with a reduced threaded extension for engaging the nut, not shown.

A worm gear 37 is mounted on the shaft 34 and held by a spline 38, as shown in Figure 1. The worm gear is formed on the underside, with an annular indentation 39 and an extended journal 41. The top of the collar 21 is adapted to fit in the indentation and the extended tapered journal designed to extend into the tapered interior of the collar, as shown in Figure 2.

The casing 17, as shown in Figure 1, is formed with oppositely disposed apertures in a plane with the worm gear 37, having inwardly projecting collars 42 and 43 adapted to receive adjustable bearing casings 44 and 45. A bearing support 46 carrying a roller bearing 47 is mounted inside the bearing casing 44 as a journal for a shaft 48 extending through the casing transversely with respect to the shaft 34. One end of the shaft 48 is journaled in a bearing 49 held in the casing 45 by an annular collar 51 formed on the inner side of a cap 52 and fixed by a nut 54. The cap 52 is fixed over the outside of the bearing casing by bolts 53.

The shaft 48 is formed with shoulders 55 and 56 fitted against the inside of the bearings 47 and 49, and an integral worm gear 57 adapted to mesh with the worm gear 37. Leakage of lubricant past the bearing 47 out of the casing 17 is prevented by a packing gland 58 mounted around the shaft 48 and seated in the top of the adjustable bearing casing 45.

The end of the shaft 48 projecting out of the casing 17 is fixed to a coupling 59 connected to the drive shaft on a prime mover 61. The prime mover 61, as shown in the drawings, is preferably of the electric type, mounted on the base 11 above the flange 12.

When the horizontal shaft 48 is driven, the shaft 34 will be likewise rotated through the interaction of the worm gears 57 and 37. A pump 62 is mounted on the base 11 and driven by a flexible driving mechanism 63 operated by the drive shaft on the motor. A suction line 64 communicating with the pump is extended through the walls 14 of the well into the bottom, and a discharge line 65 connected to an elbow 66 threaded in an aperture in the closure 27 communicating with the interior of the casing 17.

It is intended that the well 13 be filled with lubricant so that the same may be pumped out through suction line 64 and circulated by the pump through the discharge line 65 to the casing 17, where it is maintained in the casing at a level with the top of the collar 21. In this manner the upper portion of the collar 21 projecting in the indentation 39 in the bottom of the worm gear 37, maintains the two worm gears submerged in the lubricant.

A pan 67 is mounted on the shaft adjacent the bottom of the bearing 33 with the top extending above the bearing and so positioned that the lubricant entering through the elbow 66 will fall therein. When the lubricant is introduced from the pump, it enters the pan, which is thuswise kept continually full, and as the sides extend above the bearing 33, the bearing is maintained submerged in the lubricant. The excess of lubricant entering from the pump and overflowing the pan rotating with the shaft is caused to be sprayed over the sides, thus giving rise to a cooling effect against the walls of the casing 17 before it falls into the body of oil in the bottom at a level even with the top of the collar 21 acting as a dam.

A pan 68 is mounted on the lower end of the shaft adjacent the bearing 24 outside the casing 17 and extending upwardly to the bottom thereof around the downwardly projecting portion of the collar 21 and over the top of the bearing 24. The lubricant overflowing the dam formed by the collar 21 flows through the bearing 24 and into the pan 68 which, having edges extending above the bearing, maintains the same submerged in the lubricant. The lubricant overflowing from the pan 68 which also rotates with the shaft 34, is sprayed into the well in the same manner as that overflowing the pan 67, and thus a cooling effect is likewise obtained from the excess of lubricant passing into the well which is recirculated through the oil pump by conveyance through the suction line 64.

A wrist pin 69 is mounted on the end of the crank 35 and journaled in an upper bearing 71 of a connecting rod 72. The upper bearing 71 of the connecting rod 72, operated by the shaft 34 through the wrist pin 69, projecting from the crank 35, is adapted to rotate on an annular projection 73 formed in the bottom of the well 13 concentric with the shaft 34. The other end of the connecting rod 72 is bifurcated to form ears 74 and 75 acting as a clevis to receive a pin 76 having pivoted thereon the ends of a pair of toggle levers 77 and 78. The opposite ends of the toggle levers 77 and 78 are pivoted to the ends of floating crossheads 79 and 81 by pins 82 and 83. The toggle lever 78, as shown in Figure 8, is bifurcated to form ears 84 and 85 adapted to be pivoted to the ears 74 and 75 on the connecting rod 72 by the pin 76.

The crossheads 79 and 81 are adapted to operate in guides 86 and 87 formed integral with the bottom of the well 13, separated therefrom by cylindrical walls 88 and 89 formed on the base 11. The ends of the guides are open for admitting the crossheads, being adapted to be closed by caps 91 and 92 threaded or otherwise suitably secured therein.

The crossheads 79 and 81 are formed with upstanding flanges 93 and 94 having transverse apertures 95 and 96 extending therethrough. The apertures 95 and 96 are adapted to receive a pin 97 for connection with corresponding apertures 98 formed in connecting flanges 99 and 101 provided on the bottom of the conveyor trough 102, as shown in Figure 3. The connection between the flanges on the crosshead and on the bottom of the conveyor trough is reinforced by a series of plates 103.

The connection of either the flanges 93 or 94 on the crossheads with the flanges 99 and 101 on the conveyor is determined according to the direction in which it is desired to transport material. The crossheads are provided with vertical apertures 104 and 105 at the outer ends, as shown in Figures 4 and 8, for receiving a pin 106 adapted to be inserted in corresponding apertures 107 and 108 formed on the top and bottom of the guides according to which crosshead is connected through the pin 97 to the conveyor.

When it is wished to effect transportation in the direction of the arrow noted in Figure 4, the pin 106 is inserted in the aperture 107. The crosshead 79 is then fixed in position and, no longer being allowed to float, forms a fixed fulcrum for the toggle levers 77 and 78.

When the crank 35 is rotated by the driving mechanism, the toggle levers will be positioned during one end of a revolution of the crank as shown by the solid lines in Figure 4, and at the other end of the revolution will be positioned as shown by the broken lines. While progressing through these positions, the crosshead 81, which is free to float, will move as shown in the graph in Figure 5.

In this figure velocities are represented on ordinates and the angular position of the conveyer on abcissa. The horizontal line marked zero is the neutral line at which the conveyer has no velocity in either direction. The horizontal lines above the zero line, graduated 1' to 4' represent velocities in feet per second on the forward stroke of the conveyer. The horizontal lines similarly graduated below the zero or neutral line, represent the same velocities on the return or backward stroke of the conveyer. The vertical lines graduated from 30° to 180° indicate the various positions of the conveyer through a complete forward and backward stroke, comprising a complete revolution of 360°. The curve line represents the velocity of the conveyer in the course of a complete forward and backward stroke.

It will be seen that the velocity curve starts at the position of rest, at zero degrees increasing rapidly until it attains a velocity of approximately 36" per second at 115°. The conveyer is then rapidly retarded until at the end of 180° or one-half of a complete revolution it again reaches the neutral line and is momentarily at a state of complete rest. The condition of rest, is of course, actually instantaneous. The conveyer is speeded up from this point to its highest velocity on the return stroke attaining this velocity in the first 40° at the 120°. From this point it then gradually reaches the state of complete rest or zero motion at the completion of the full revolution of 360°.

The velocities are so gauged that on the forward stroke (from zero degrees to 105°) they are at no point sufficiently great to overcome the friction between the conveyer trough and the material being conveyed. The material therefore will move forward with the conveyer at just the same velocity during this portion of the forward stroke.

When the conveyer is rapidly slowed up during the remaining 75° of the forward stroke, the kinetic energy accumulated by the material during the first part of the forward stroke is sufficiently great to enable it to overcome the friction between the material and the conveyer causing the material to slide forward while the conveyer is passing from 105° to 180°. When the conveyer reaches the 180° point constituting one-half of a complete revolution which is the end of the forward stroke, the material will still be in motion.

At this point the conveyer accomplishes that portion of the complete revolution embraced within the first 65° of the return stroke (from 180° to 115°) or 180° to 245° increasing the forward sliding of the material by being rapidly drawn back from underneath the same.

When properly controlled and regulated the sliding motion of the material will continue from the first 65° of the backward stroke from 180° to 115°, after which it will move backward with the conveyer through the next 115°.

It will be noted that the conveyer gradually slows up from 115° until it reaches the end of the backward stroke at zero or 360°. When the conveyer reaches this point of zero motion no kinetic energy remains in the material to cause it to slide backward in the conveyer trough and consequently it remains at rest until it is agitated by the successive forward stroke.

Loaded conveyers frequently attain a total weight of more than 20 tons, which must move forward at the highest permissible velocity and be brought to a momentary or instantaneous stop and immediately reversed, such reversals of stroke occurring as frequently as 80 times per minute. It has thus far been impossible to construct a driving mechanism within practical limits, having the ability to withstand the enormous strain incurred when the conveyer is operated so as to show a diagram approaching as nearly as possible to that which is considered most efficient, such for example as is accomplished by the present drive. It may readily be seen that a driving mechanism would necessarily have to be built so heavy as to be extremely unwieldy and to sacrifice mobility which is among the most essential of requirements. Regardless of structure, there has not been provided, previous to this time, a comparable motion by any set of gears or levers employing a rotable drive.

When the crosshead 79 is fixed by the pin 106, it is intended that the crosshead 81 be connected to the bottom of the conveyor trough 102 through the pin 97 engaging the corresponding apertures in the flange 94 on the crosshead and in one end of the flanges 99 and 101 on the bottom of the conveyor. In this manner, the conveyor trough 102 is connected directly to the crosshead 81 and is caused to move in the same manner and impart the same velocity, as is shown in the graph illustrated in Figure 5.

If it is wished to change the direction of the drive and effect transport in the opposite direction as indicated by the arrow in Figure 6, the pin 106 fixing the crosshead 79 is removed and the crosshead 81 is moved until the aperture 104 is in alignment with the aperture 108 in the guide. The pin 106 is then inserted therein as shown in Figures 6 and 8, thereby fixing the crosshead 81 and allowing the crosshead 79 free to float.

In this manner the crosshead 81 becomes the fixed fulcrum for the toggle levers 77 and 78, so that the levers will be positioned during one end of a revolution of the crank as shown by the solid lines in Figure 6 and on the other end will be positioned as shown by the dotted lines. While progressing through these positions, the crosshead 79 will move as shown in the graph in Figure 7. This graph is substantially the same as that already described in Figure 5 except that the direction of strokes is reversed.

The conveyer is connected to the crosshead 82 by the pin 97 engaging the corresponding apertures in the flange 93 formed on the top of the crosshead, and the opposite aperture in the other end of the flanges 99 and 101 on the bottom of the conveyor. The conveyor trough 102, connected directly to the crosshead 82, will move in the same manner with the same velocities as the crosshead, to effect transport of material in the apposite direction to that previously described in accordance with the graph shown in Figure 7.

It will be readily appreciated that this drive is readily reversible by first removing the pin 106 from either the vertical aperture 107 or 108 in the crossheads 79 and 81 and the insertion in the opposite side. At the same time which ever crosshead is free to float is attached to the conveyor trough through the pin 97 inserted in the aperture 98 in the upstanding flanges 99 and 101 mounted on the bottom thereof.

The operation of the driving mechanism may be readily understood by first having reference to Figure 1. The shaft 34 journaled in the top and bottom of the casing 17, operating the motion translating mechanism, is driven through the drive shaft 48 by the worm gear 57 formed integral thereon, engaging the worm gear 37 mounted on the shaft. The drive shaft 48 is operated by the electric motor 61 mounted on the base 11 supporting the mechanism. It is manifest that any other source of motive power in the form of other types of prime movers may be substituted for that shown, and maintained in the same manner on the base or mounted apart from the driving mechanism.

The worm gears 37 and 57 are maintained submerged in oil by the dam in the bottom of the casing 17 formed by the collar 21 projecting in the indentation 39 formed on the underside of the worm gear 37. The bearings 24 and 33 in which the ends of the shaft 34 are journaled are maintained submerged in oil by the pans 67 and 68 mounted on the shaft and rotating therewith, projecting above the top of the bearings. The pump 62 connected to the drive shaft 48 provides a continual circulation of the lubricant from the well 13 through the casing 17 which at the same time affords a cooling effect on the oil overflow sprayed on the tops of the pans 67 and 68. It is apparent that any suitable type of pump may be employed and driven by the prime mover as illustrated or operated from any other suitable source, as it is also obvious that in place of the belt on the drive shaft, a chain or gearing arrangement may be used.

The motion translating mechanism formed by the connecting rod 72, pivoted on the wrist pin 71 operated by the crank 35 and connected to the crossheads 79 and 81 through the toggle levers 77 and 78 is maintained continually submerged in oil, as the level of lubricant is adapted to be maintained above the parts. In the event of the failure of the pump 62, the bearings 33 and 24 will remain maintained submerged in the lubricant in the pans 67 and 68 in the same manner as the worm gears 57 and 37, by reason of the collar 21 maintaining the level of the oil about the major portion of the worm gears in the bottom of the casing 17. Any such failure may be noticed, moreover, before any serious damage occurs by reason of the lubricant in the casing 17 becoming heated and causing odors that will advise that there has been an interruption in the flow of the lubricant.

In mounting the driving mechanism, it is deemed preferable to place the base 11 on a bed plate 109, as shown in Figure 3, and mount the same under a conveyor trough for engagement with the crossheads by which it is desired to operate the conveyor directly with the bottom of the trough.

There is accomplished by this invention a driving mechanism for a reciprocating conveyor in which the direction of the drive may be reversed by the manipulation of two floating crossheads, and in which the bearings may be maintained submerged in lubricant, and at the same time a cooling effect of a lubricant is obtained, and in which the conveyor trough may be attached directly to the crossheads moving back and forth in a fixed horizontal and vertical plane, thereby relieving the pendulum stresses, and the mechanism encased to conserve headroom for mounting, whereby a positive and fixed location of the same with respect to the conveyor trough to which it is connected is assured.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A conveyor drive comprising, floating means operating in longitudinal alignment with the conveyor to impart strokes of reciprocating motion, and means operating the reciprocating motion-imparting means to reverse the strokes of reciprocating motion.

2. A conveyor drive comprising, floating means operating in longitudinal alignment with the conveyor to impart strokes of reciprocating motion and means carried by the reciprocating motion-imparting means to reverse the strokes of reciprocating motion.

3. A drive comprising, a plurality of aligned crossheads operating in guides, and means to selectively operate the cross head.

4. A drive comprising, a plurality of aligned crossheads operating in guides, and means carried by the guides to selectively operate the cross heads to reverse the strokes imparted thereby.

5. A conveyor drive comprising, means to translate rotary motion, a plurality of levers connected to crossheads mounted in aligned guides operated by the motion translating means, means formed on the crossheads for connection with a conveyor, and means carried by the guides adapted to cooperate with means formed in the crossheads to selectively operate the cross heads to reverse the strokes imparted thereby.

6. A conveyor drive comprising a rotary member, a plurality of reciprocating members for selective operation thereby, the respective reciprocating members being adapted to selectively impart reverse strokes of reciprocating motion.

7. A conveyor drive comprising a rotary member, a plurality of reciprocating members selectively operated thereby, and means to fix one of the reciprocating members whereby reciprocating motion is imparted by the other.

8. A conveyor drive comprising a rotary member, a plurality of reciprocating members selectively operated thereby, and means to fix one of the reciprocating members whereby reciprocating motion is imparted by the other reciprocating member, the motion imparted by the drive being adapted to be reversed by freeing the first reciprocating member and fixing the second reciprocating member.

9. A conveyor drive comprising a rotary member, a plurality of reciprocating members selectively operated thereby, and means to fix one of the reciprocating members whereby the forward stroke is gradually accelerated for substantially two-thirds its length and rapidly decelerated the remainder of the stroke, and a backward stroke rapidly accelerated for substantially one-third its length and gradually decelerated the remainder of the stroke, and imparted by the other reciprocating member.

10. A conveyor drive comprising a rotary member, a plurality of reciprocating members selectively operated thereby, means to fix one of the reciprocating members whereby the forward stroke is gradually accelerated for substantially two-thirds its length and rapidly decelerated the remainder of the stroke, and means to reverse the order of acceleration and deceleration of the strokes imparted by the drive by freeing the first reciprocating member and fixing the second reciprocating member.

In testimony whereof I affix my signature.

RAYMOND A. WALTER.